US012697008B2

(12) United States Patent
Wong et al.

(10) Patent No.: US 12,697,008 B2
(45) Date of Patent: Aug. 4, 2026

(54) DISH WASHING MACHINE USING INDUCTION HEATING

(71) Applicant: K.D.W. Company Limited, Hong Kong (CN)

(72) Inventors: Kwok Din Wong, Hong Kong (CN); Sai Hin Wong, Hong Kong (CN); Hang Yan Wong, Hong Kong (CN)

(73) Assignee: K.D.W. Company Limited, Hong Kong (CN)

( * ) Notice: Subject to any disclaimer, the term of this patent is extended or adjusted under 35 U.S.C. 154(b) by 30 days.

(21) Appl. No.: 18/746,926

(22) Filed: Jun. 18, 2024

(65) Prior Publication Data

US 2025/0380850 A1 Dec. 18, 2025

(51) Int. Cl.

| | |
|---|---|
| ***A47L 15/00*** | (2006.01) |
| ***A47L 15/42*** | (2006.01) |
| ***F24H 1/00*** | (2022.01) |
| ***F24H 9/1818*** | (2022.01) |
| ***H05B 6/10*** | (2006.01) |
| ***H05B 6/36*** | (2006.01) |

(52) U.S. Cl.

CPC ....... *A47L 15/0007* (2013.01); *A47L 15/4214* (2013.01); *A47L 15/4285* (2013.01); *A47L 15/4291* (2013.01); *F24H 1/0018* (2013.01); *H05B 6/10* (2013.01); *H05B 6/36* (2013.01); *A47L 15/428* (2013.01); *F24H 9/1818* (2013.01)

(58) Field of Classification Search

None

See application file for complete search history.

(56) References Cited

U.S. PATENT DOCUMENTS 10,905,306 B2 2/2021 Wong et al.
2021/0228060 A1* 7/2021 Wong .................. A47L 15/4291

FOREIGN PATENT DOCUMENTS

DE 102020109140 A1 * 10/2020
KR 20110015238 A * 2/2011
KR 101858971 B1 * 5/2018

OTHER PUBLICATIONS

U.S. Appl. No. 18/457,569.

* cited by examiner

*Primary Examiner* — Kaj K Olsen
*Assistant Examiner* — Richard Z. Zhang
(74) *Attorney, Agent, or Firm* — FLYNN THIEL, P.C.

(57) ABSTRACT

A dish washing machine comprising a housing having an interior wash space, a liquid inlet for adding fresh water therein, a liquid outlet for removing dirty liquid, a first water tank for receiving the water from the liquid inlet, the first water tank including a first heating system for heating the fresh water, first piping for delivering the heated fresh water to at least one spray nozzle, a second water tank configured to receive the heated fresh water from the interior wash space, the second water tank including a second heating system for heating the heated fresh water to form heated wash water, and second piping for delivering the heated wash water to the at least one spray nozzle for spraying the heated wash water into the interior wash space. At least one of the first heating system and the second heating system heats water through induction.

8 Claims, 13 Drawing Sheets

DISH WASHING MACHINE USING INDUCTION HEATING

FIELD OF THE INVENTION

This disclosure relates generally to the field of dish washing machines, and in particular to a dish washing machine using induction heating.

BACKGROUND OF THE INVENTION

Commercial establishments for cooking and/or preparing food typically have a commercial dish washer for washing dirty dishes. The dish washers spray a detergent and water onto the dirty dishes to clean the dishes. The dish washers can also spray a rinse aid and water onto the dishes after the dishes have been washed to rinse the dishes and prevent spots on the dishes.

Currently, there are four main types of commercial dish washers in worldwide markets. The commercial dish washers include an under-counter dish washing machine, a hood or door type dish washing machine, a tunnel type dish washing machine and a flight type dish washing machine. The under-counter dish washing machine has a small size and low profile and is positioned under a separate work bench with a wash basin next to the space occupied by the under-counter dish washing machine. The hood or door type dish washing machine, the tunnel type dish washing machine and the flight type dish washing machine all have a medium to large size and are positioned next to a separate side bench with a wash basin on the bench. The under-counter dish washing machine, the hood or door type dish washing machine and the tunnel type dish washing machine all typically use a rack or container having the dirty dishes that is positioned within the machine. The flight type dish washing machine has dishes that are put directly onto an integral conveyor and washed as the dishes pass therethrough.

A more efficient and environmentally friendly commercial dish washer is desired.

SUMMARY OF THE INVENTION

The present invention, according to one aspect, is directed to a dish washing machine comprising a housing having an interior wash space for washing dishes, a liquid inlet for adding fresh water to the dish washing machine, a liquid outlet for removing dirty liquid from the dish washing machine, a first water tank for receiving the water that entered the housing through the liquid inlet, with the first water tank including a first heating system for heating the fresh water to form heated fresh water, first piping for delivering the heated fresh water to at least one spray nozzle for spraying the heated fresh water onto dishes positioned within the interior wash space, a second water tank configured to receive the heated fresh water from the interior wash space, with the second water tank including a second heating system for heating the heated fresh water to form heated wash water, and second piping for delivering the heated wash water to the at least one spray nozzle for spraying the heated wash water into the interior wash space. At least one of the first heating system and the second heating system heats water through induction.

Another aspect of the present invention is to provide a method of washing dishes comprising providing a housing having an interior wash space for receiving dishes, adding fresh water to a dish washing machine, delivering the fresh water to a first water tank, heating the fresh water in the first water tank with a first heating system to form heated fresh water, supplying the heated fresh water to at least one spray nozzle, spraying the heated fresh water onto dishes positioned within the interior wash space, delivering the heated fresh water from the interior wash space to a second water tank, heating the heated fresh water in the second water tank with a second heating system to form heated wash water, delivering the heated wash water to the at least one spray nozzle, and spraying the heated wash water into the interior wash space. At least one of the first heating system and the second heating system heats water through induction.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

Figure 1:
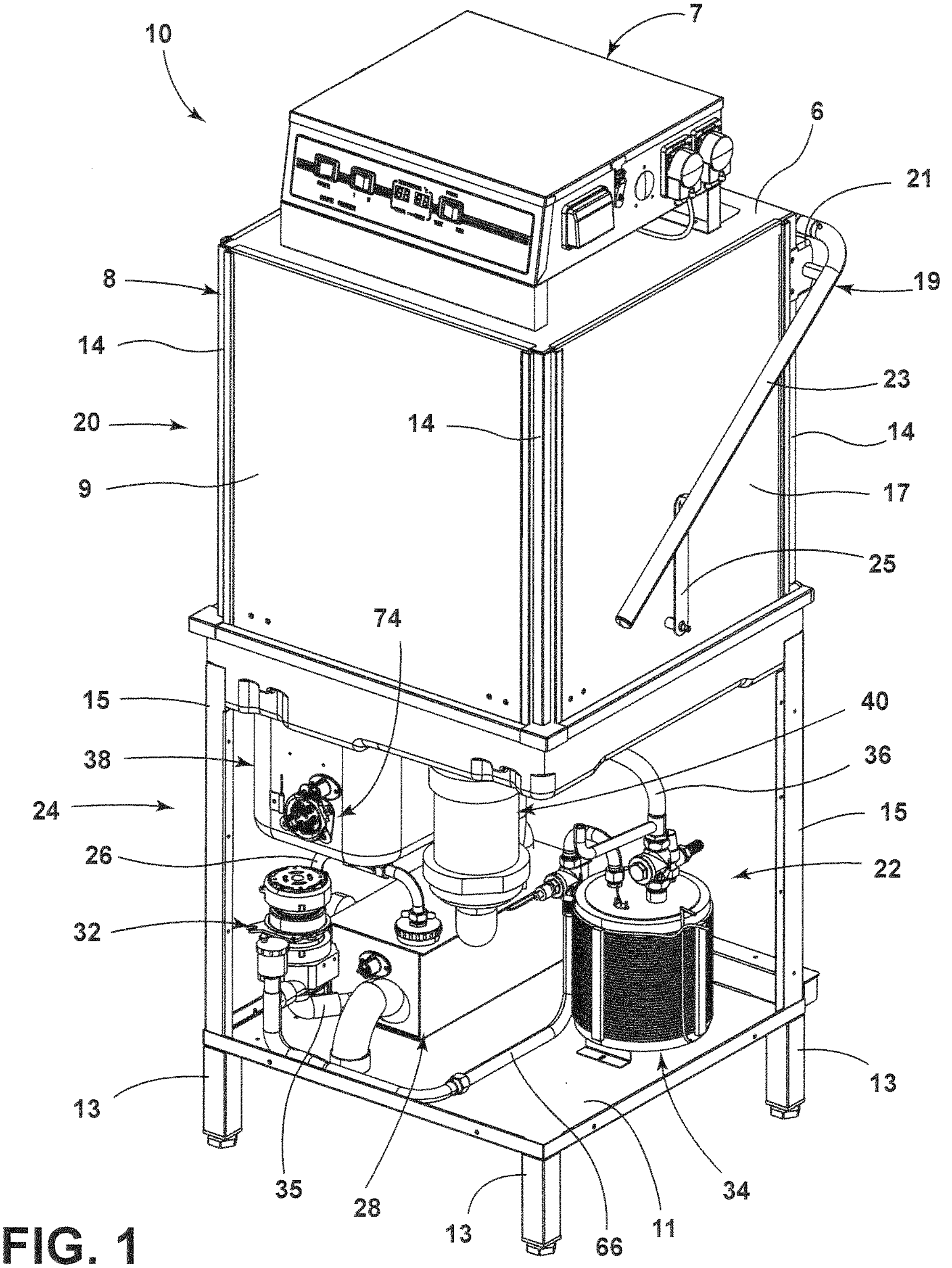
FIG. 1 is a front perspective view of a dish washing machine according to a first embodiment of the present invention.

Certain terminology will be used in the following description for convenience in reference only and will not be limiting. Said terminology will include the words specifically mentioned, derivatives thereof, and words of similar import.

DETAILED DESCRIPTION

Reference will now be made in detail to implementations and embodiments of various aspects and variations of the invention, examples of which are illustrated in the accompanying drawings. Although at least two variations of the systems, methods and uses are described, other variations of the systems, methods and uses may include aspects of the systems, methods and uses described herein combined in any suitable manner having combinations of all or some of the aspects described.

An aspect of the present invention is to employ an inductive heating system to heat rinse and wash water in a dish washing machine. The dish washing machine using the inductive heating system can be domestic or industrial and can comprise any type of dish washing machine including an under-counter dish washer, a door/hood/rack/upright dish washer, a tunnel/conveyor dish washer and a flight type dish washer. The dish washing machine 10 described herein is a hood dish washer, but the system described herein could be used in any type of dish washing machine.

FIGS. 1-7 illustrate various partial views of a first embodiment of a dish washing machine 10. The dish washing machine 10 includes an upper housing portion 20 and a lower housing portion 24. The upper housing portion 20 defines an interior wash space 12 for accepting dishes (e.g., glasses, plates, eating and serving utensils, etc.) for cleaning the dishes. A system 22 for supplying the water to the interior wash space 12 of the upper housing portion 20 of the dish washing machine 10 is mostly located in the lower housing portion 24 of the dish washing machine 10 located under the upper housing portion 20 of the dish washing machine 10.

The illustrated lower housing portion 24 holds most of the system 22 for supplying water to the interior wash space 12. The lower housing portion 24 includes a substantially rectangular bottom plate 11 supported by a plurality of legs 13 adjacent each corner thereof. Support bars 15 extend upward from each corner of the substantially rectangular bottom plate 11, with the upper housing portion 20 being supported on a top of the support bars 15. Walls surround the lower housing portion 24 to enclose the system 22 within the walls. In FIGS. 1-5, the walls and one of the support bars 15 are removed to better illustrate the interior components of the lower housing portion 24 of the dish washing machine 10.

In the illustrated example, the upper housing portion 20 includes a wash housing 8 enclosing the interior wash space 12 and a control box 7 located on top of the wash housing 8. The control box 7 includes a plurality of displays, buttons (real or touch screen) and switches to control the settings for the dish washing machine 10 during use thereof. Such displays, buttons (real or touch screen) and switches, along with the control system within the control box 7, for controlling a dish washing machine 10 are well known to those skilled in the art.

The illustrated wash housing 8 encloses the interior wash space 12 during the process of washing the dishes as described herein. As shown in FIG. 1, the wash housing 8 includes a fixed front wall 9, a pair of sliding side walls 17, a fixed rear wall (not shown), and a top wall 6 supporting the control box 7. The pair of sliding side walls 17 are configured to slide vertically in vertically extending grooves on posts 14 located at all four corners of the dish washing machine 10. A U-shaped handle 19 is pivotally attached to a pair of brackets 21 extending rearwardly from the rear posts 14 as shown in FIG. 1, thereby allowing the U-shaped handle 19 to pivot about the brackets 21. Side arms 23 of the U-shaped handle 19 extend adjacent to the sliding side walls 17. As the U-shaped handle 19 is pivoted about the brackets 21 to move the side arms 23 upward, a first end of lift bars 25 rotatably connected to the side arms 23 of the U-shaped handle 19 are also raised. As the lift bars 25 are raised, a second end thereof rotatably connected to the sliding side walls 17 lifts the sliding side walls 17 along grooves in the posts 14 to open up the interior wash space 12 to allow dishes to be positioned in the interior wash space 12 to be washed and removed from the interior wash space 12 once the wash sequence is complete. It is contemplated that other door or wall systems can be employed to selectively allow access to the interior wash space 12.

Figure 2:
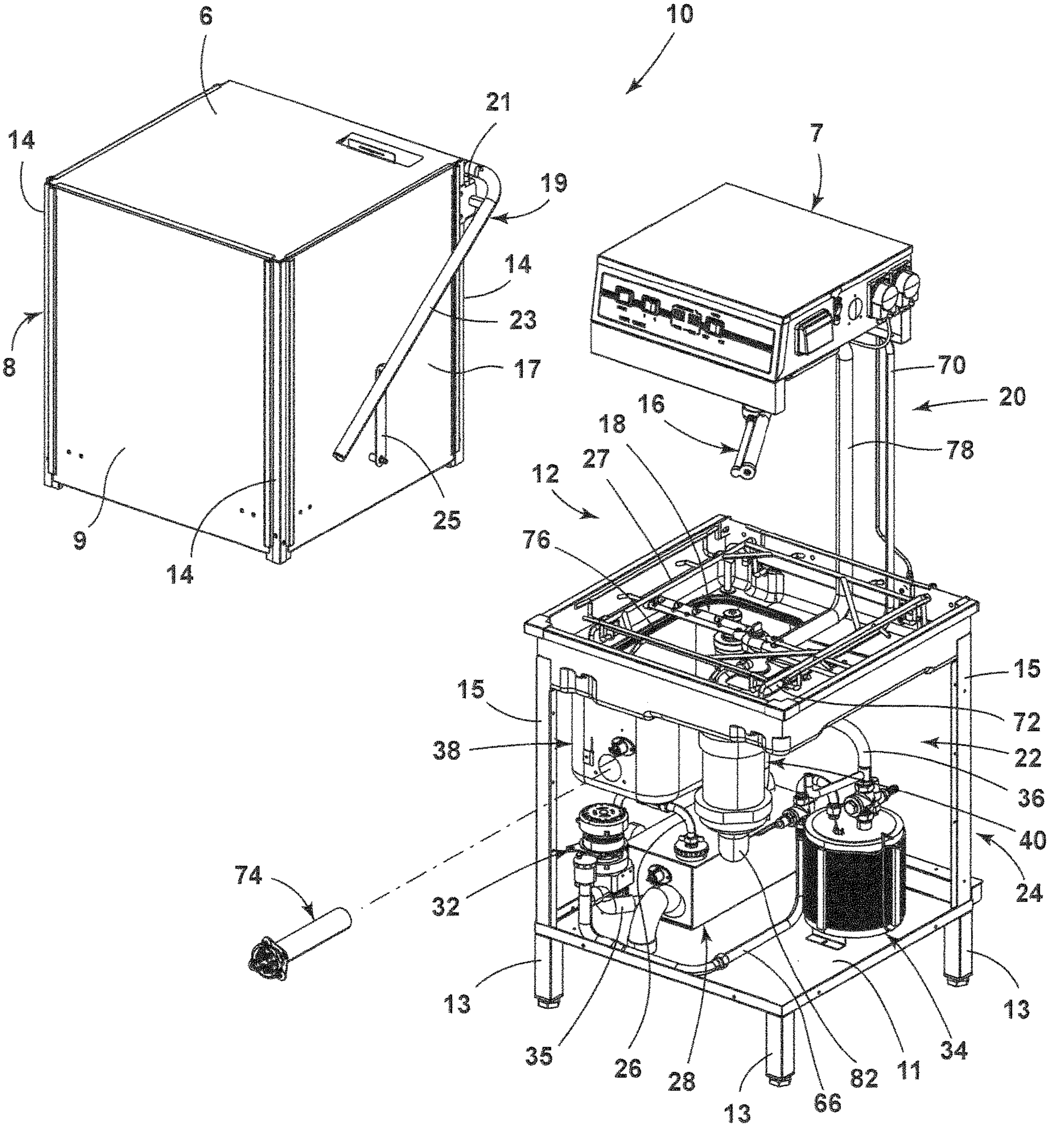
FIG. 2 is a front perspective exploded view of the dish washing machine according to the first embodiment of the present invention.
Figure 3:
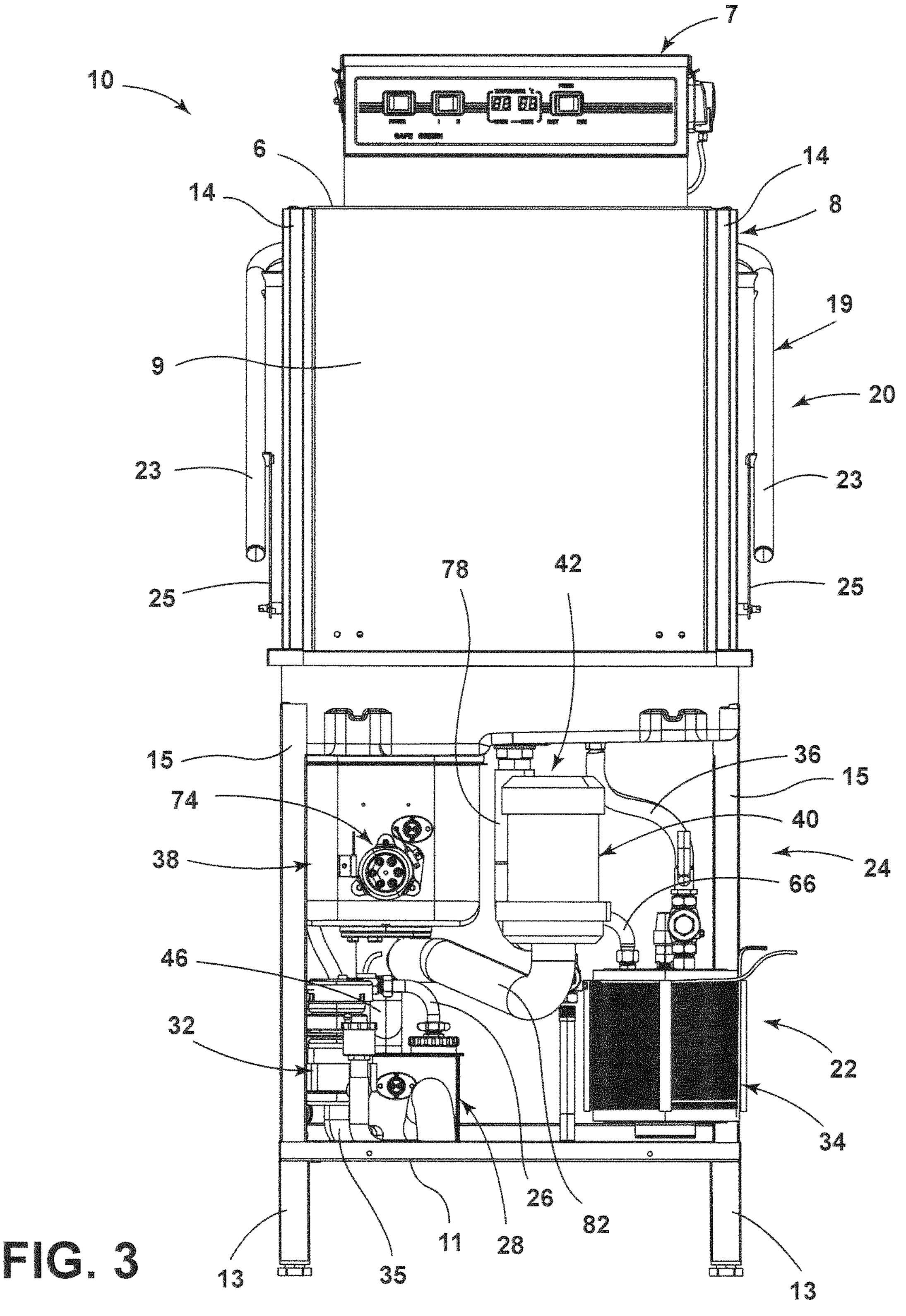
FIG. 3 is a front view of a dish washing machine according to the first embodiment of the present invention.

In the illustrated example as shown in FIG. 2, the interior wash space 12 can include at least one shelf or ledge 27 as is known to those skilled in the art for directly holding the dishes or holding a tray or rack holding the dishes. The interior wash space 12 of the dish washing machine 10 includes a top rotating spray arm 16 located at a top of the interior wash space 12 for positioning above the dishes (and possibly the tray or rack) along with a bottom rotating spray arm 18 located at a bottom of the interior wash space 12 and below the dishes (and possibly the tray or rack) for spraying water, a washing fluid and/or a rinsing fluid onto the dishes to clean and rinse the dishes. Water (fresh, with a wash detergent, or with a rinse aid) is supplied to the top rotating spray arm 16 and the bottom rotating spray arm 18 to wash and rinse the dishes. The interior wash space 12, the top rotating spray arm 16 and the bottom rotating spray arm 18 are all located in the upper housing portion 20 of the dish washing machine 10 enclosed by the wash housing 8. Other configurations for spraying the water onto the dishes are contemplated. For example, the system could use only one of the top rotating spray arm 16 or the bottom rotating spray arm 18, the arms could be stationary and/or could employ other nozzles (e.g., stationary nozzles extending from interior walls) for spraying water onto the dishes for cleaning the dishes.

FIGS. 1-5 illustrate the system 22 for supplying the water to the interior wash space 12 of the dish washing machine 10 via the top rotating spray arm 16 and the bottom rotating spray arm 18. The system 22 for supplying the water to the interior wash space 12 is mostly located in a lower housing portion 24 of the dish washing machine 10 located under the upper housing portion 20 of the dish washing machine 10.

In the illustrated embodiment, the system 22 passes water therethrough to wash and rinse the dishes in the interior wash space 12 of the dish washing machine 10. The system includes a fresh water connection tube 26, a fresh water reservoir 28, a rinse water pump 32, a rinse water induction heated tank system 34, rinse water piping 36, the spray arms 16 and 18, a wash water tank 38, a wash water pump 40, wash water piping 42, a hot waste water drain pipe 46, and a waste water drain 48. The elements of the system 22 are discussed in more detail below along with the flow path of water through the system 22.

Figure 4:
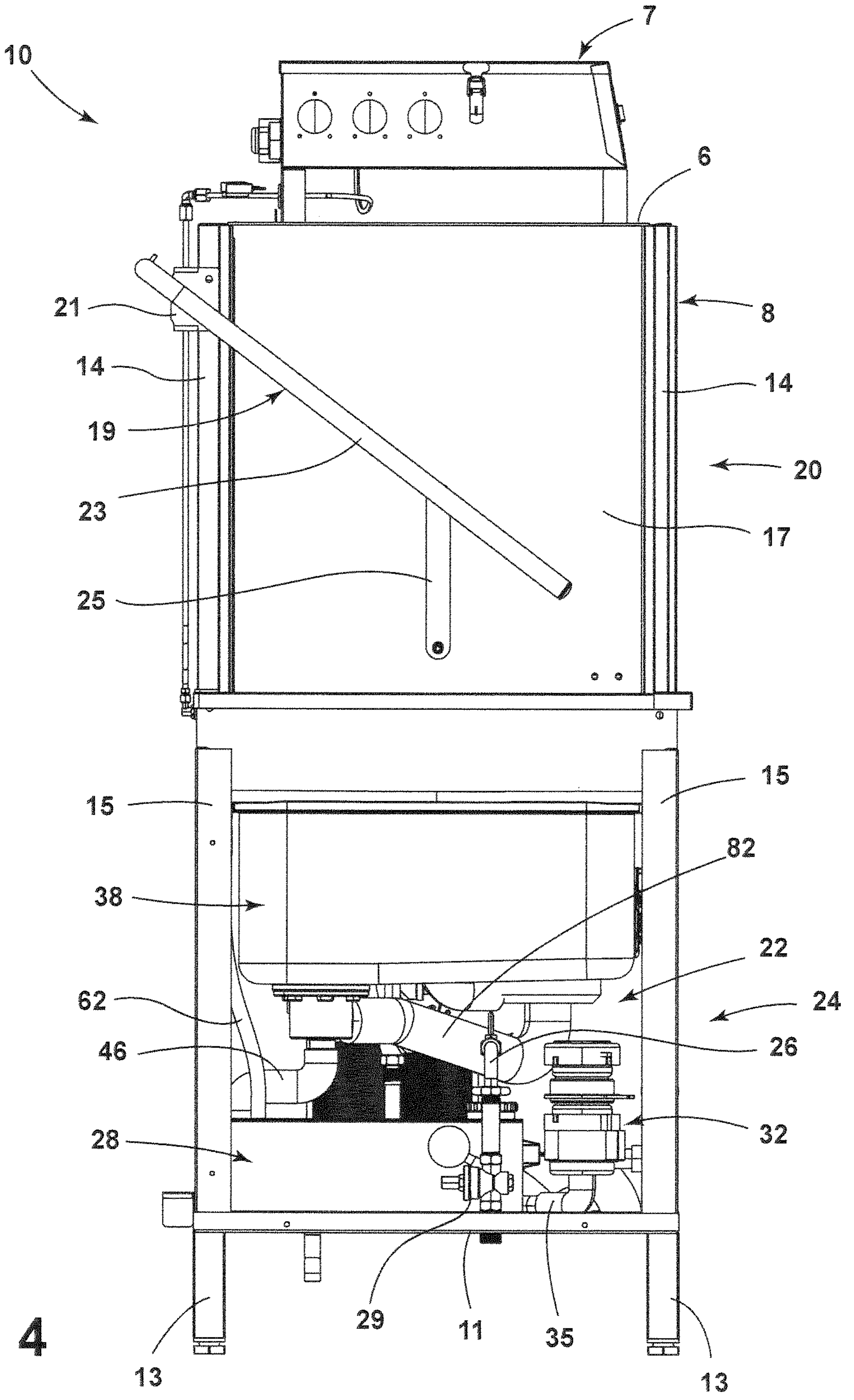
FIG. 4 is a left side view of a dish washing machine according to the first embodiment of the present invention.
Figure 5:
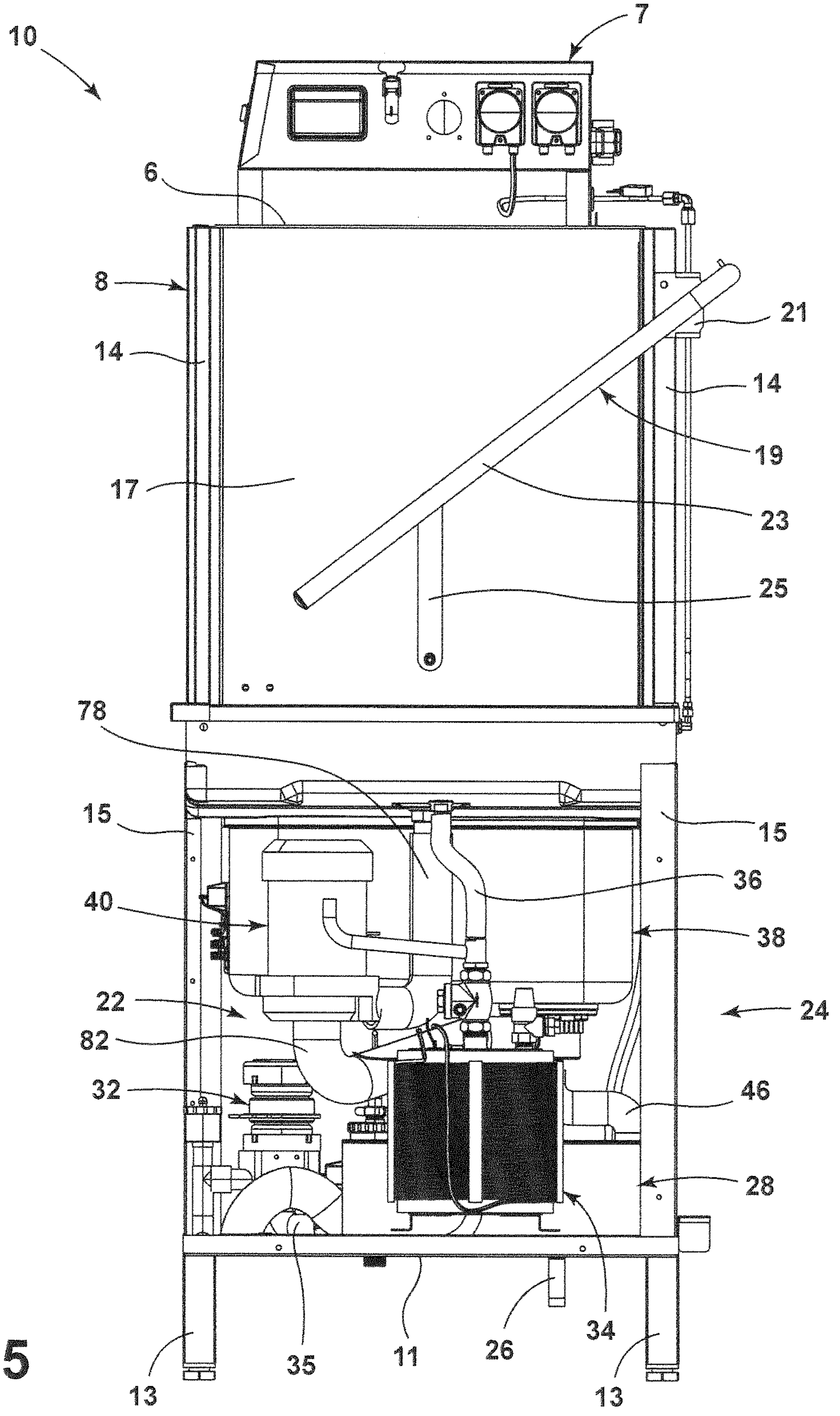
FIG. 5 is a right side view of a dish washing machine according to the first embodiment of the present invention.

Water enters the illustrated dish washing machine 10 through the fresh water connection tube 26 that, in the illustrated example, extends through the bottom plate 11 (see FIGS. 4 and 5). The fresh water connection tube 26 is connected to an external source of fresh water as is well known to those skilled in the art, and the fresh water connection tube 26 can be connected to the external source of fresh water through a bottom or any side walls of the lower housing portion 24. It is contemplated that the fresh water connection tube 26 could include a pressure regulator 29 (see FIG. 4) for regulating the pressure inputted into the dish washing machine 10. The fresh water connection tube 26 supplies fresh water to the fresh water reservoir 28.

Figure 6:
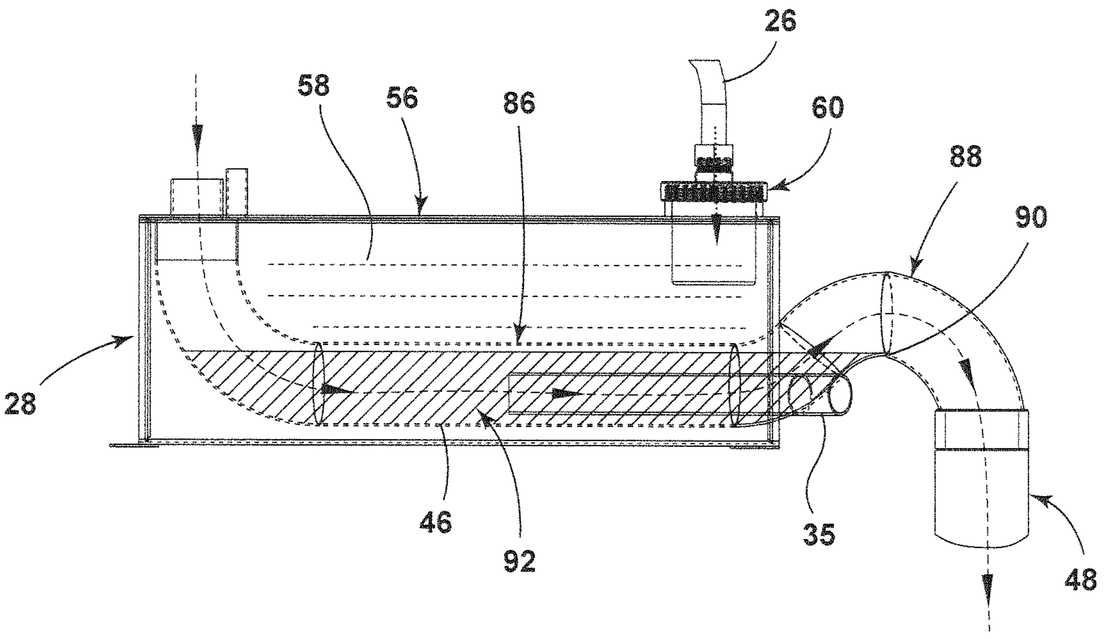
FIG. 6 is a partial side view of a portion of the system for supplying the water to the interior wash space.

The illustrated fresh water reservoir 28 holds fresh water before use in the dish washing machine 10 and includes a first stage for heating the water for use in the system 22. The fresh water reservoir 28 includes a fresh water housing 56 with an interior fresh water holding space 58 as shown in FIG. 6. The fresh water from the fresh water connection tube 26 is supplied to the interior fresh water holding space 58 through a fitting 60 connected to the fresh water housing 56 as shown in FIG. 6. It is contemplated that the fitting 60 could include a filter for keeping contaminates from entering the fresh water reservoir 28. As discussed in more detail below, the fresh water reservoir 28 has the hot waste water drain pipe 46 passing therethrough for exchanging heat from the hot waste water drain pipe 46 to the fresh water in the interior fresh water holding space 58. It is noted that the fresh water in the interior fresh water holding space 58 of the fresh water reservoir 28 might not have been heated with the hot waste water drain pipe 46 if the dish washing machine 10 has not been used recently to wash and rinse dishes as the interior of the hot waste water drain pipe 46 would not be hot because of the inactivity. As illustrated in FIG. 4, an overflow tube 62 can be connected to a top of the fresh water housing 56. The overflow tube 62 has an inverted U-shaped open end located above a top of the wash water tank 38 for allowing excess water pressure in the fresh water housing 56 to be released if needed.

In the illustrated example, the heated fresh water in the interior fresh water holding space 58 of the fresh water reservoir 28 is pumped therefrom to the rinse water induction heated tank system 34 by the rinse water pump 32. The rinse water pump 32 pulls the heated fresh water in the interior fresh water holding space 58 of the fresh water reservoir 28 through a short pipe 35 and pushes the heated fresh water through pump piping 66 to the rinse water induction heated tank system 34.

Figure 7:
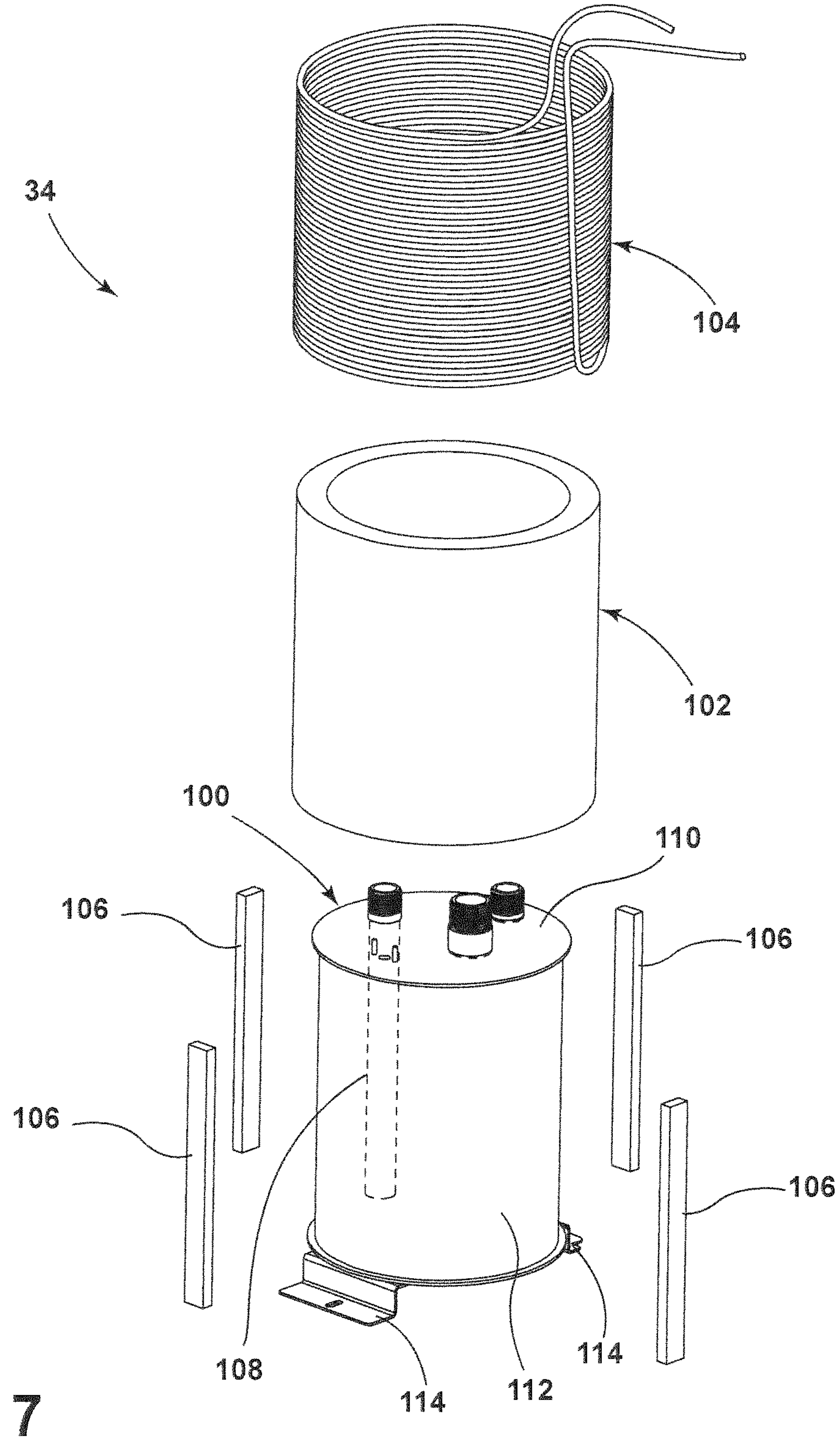
FIG. 7 is an exploded view of a first embodiment of an induction water heating system.
Figure 8:
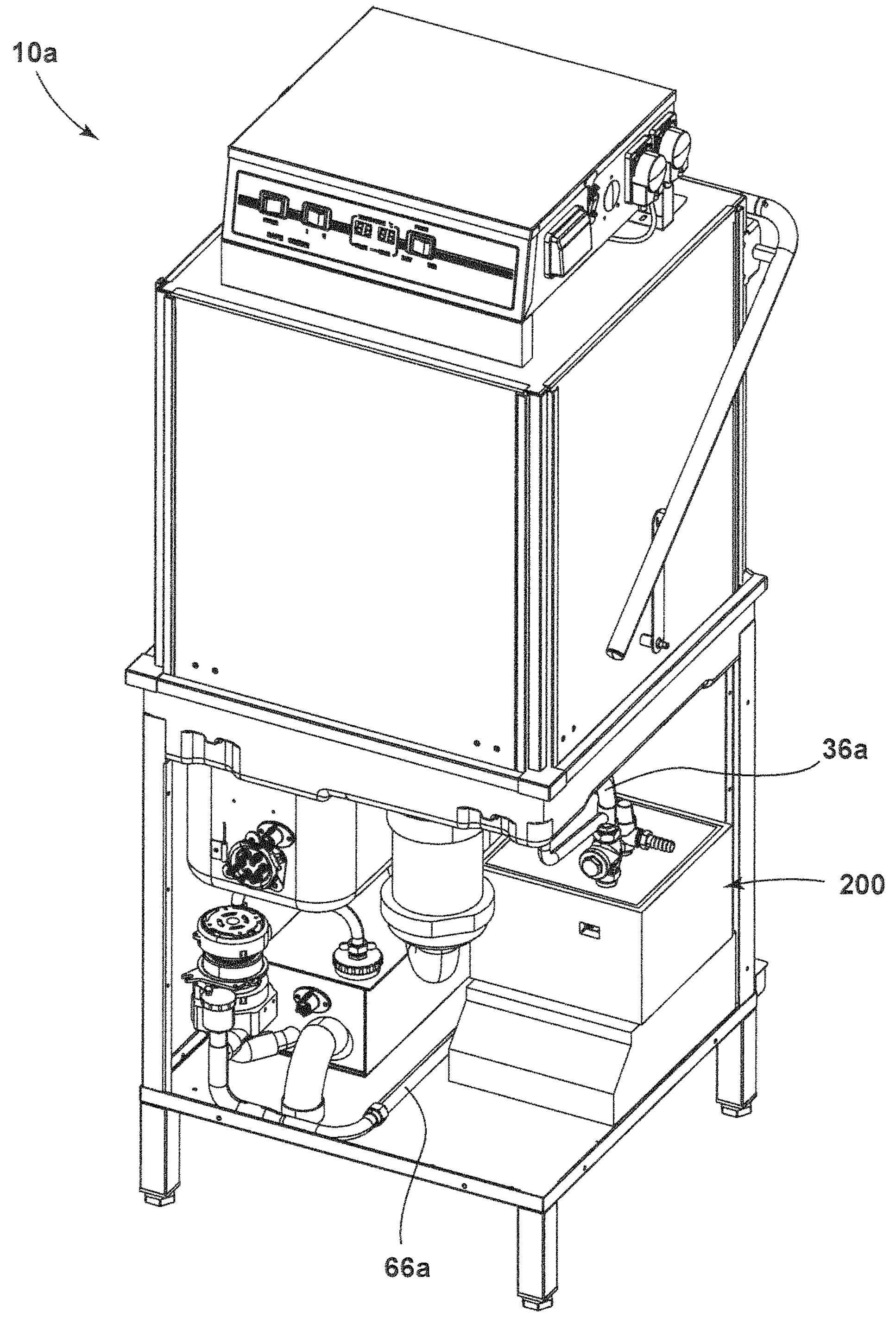
FIG. 8 is a front perspective view of a dish washing machine according to a second embodiment of the present invention.
Figure 9:
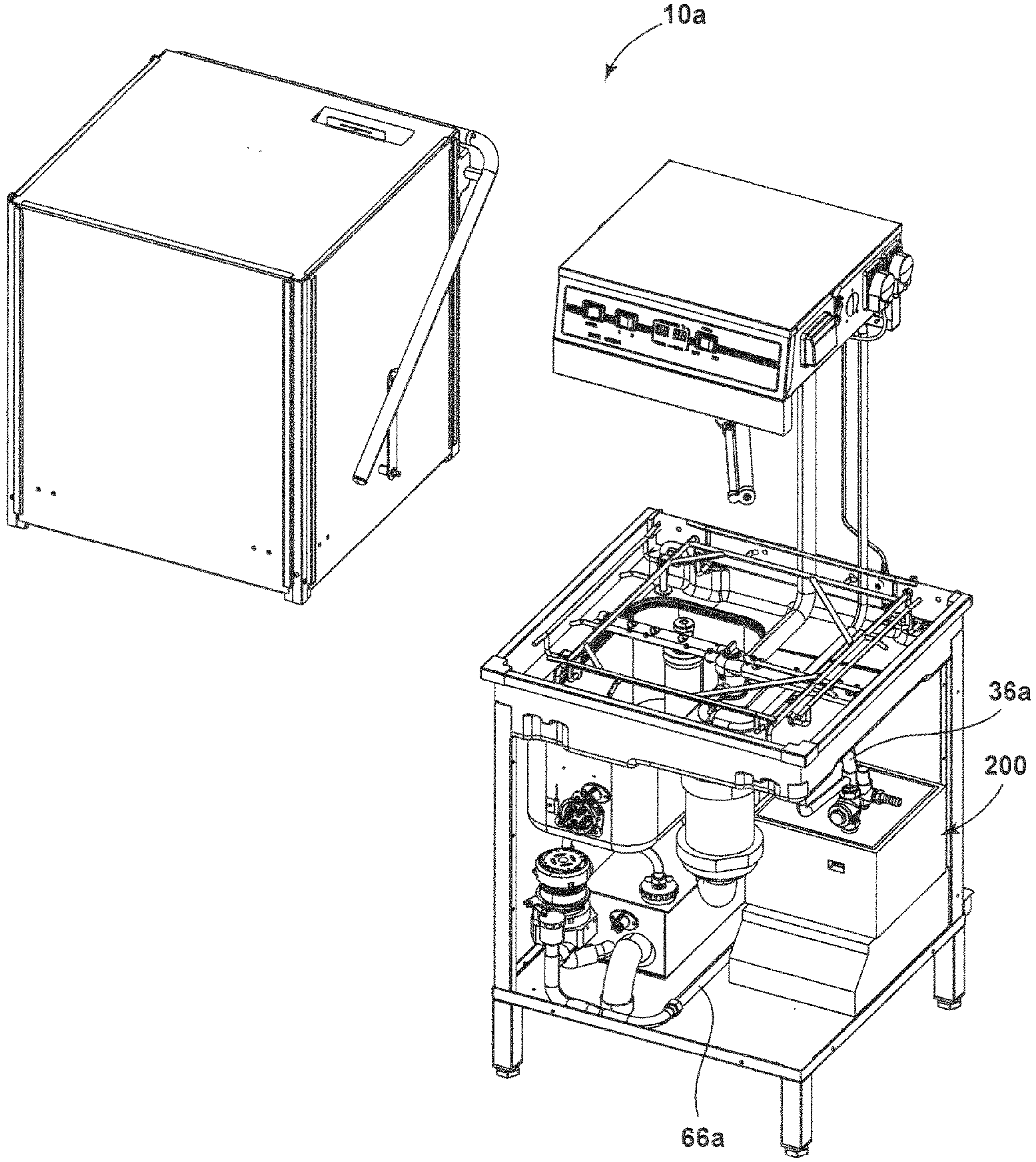
FIG. 9 is a front perspective exploded view of the dish washing machine according to the second embodiment of the present invention.
Figure 10:
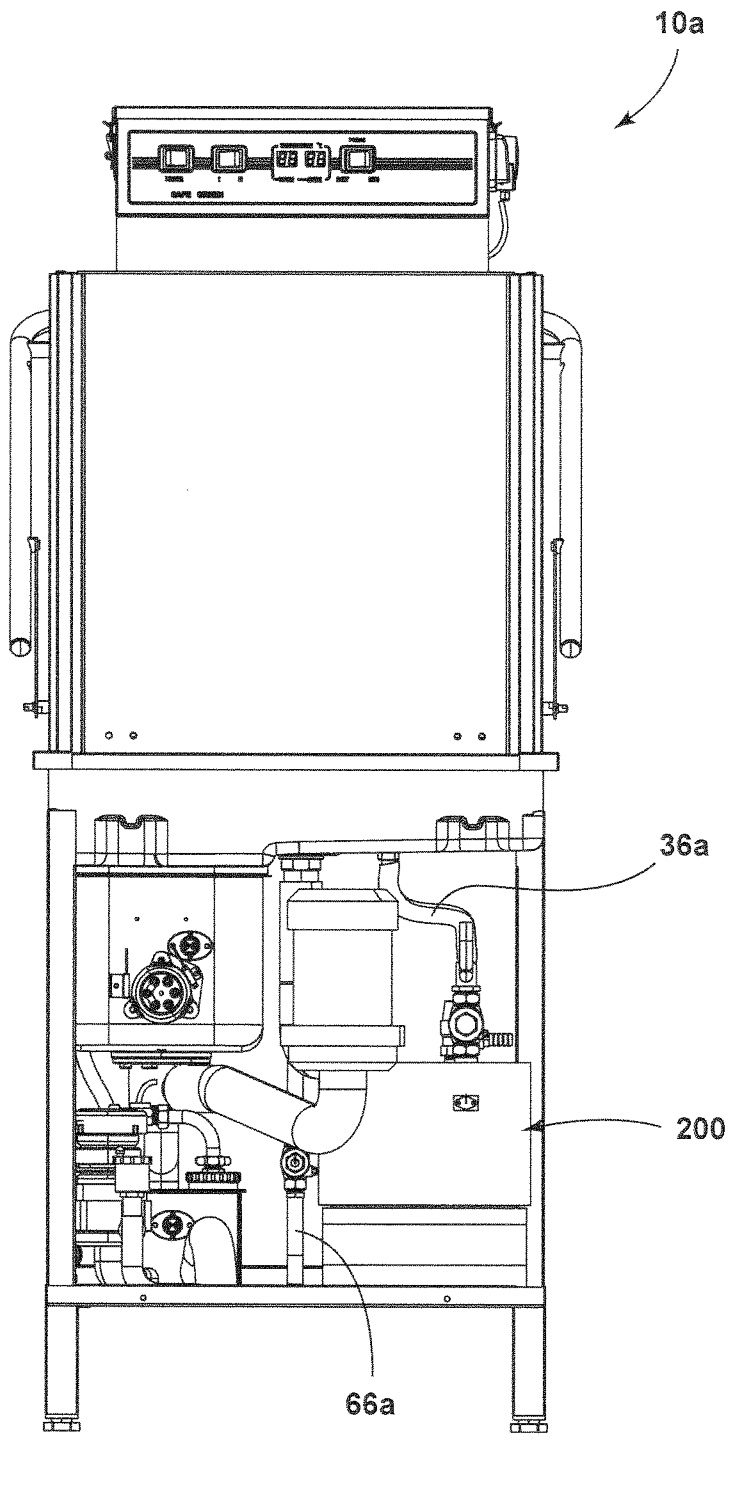
FIG. 10 is a front view of a dish washing machine according to the second embodiment of the present invention.
Figure 11:
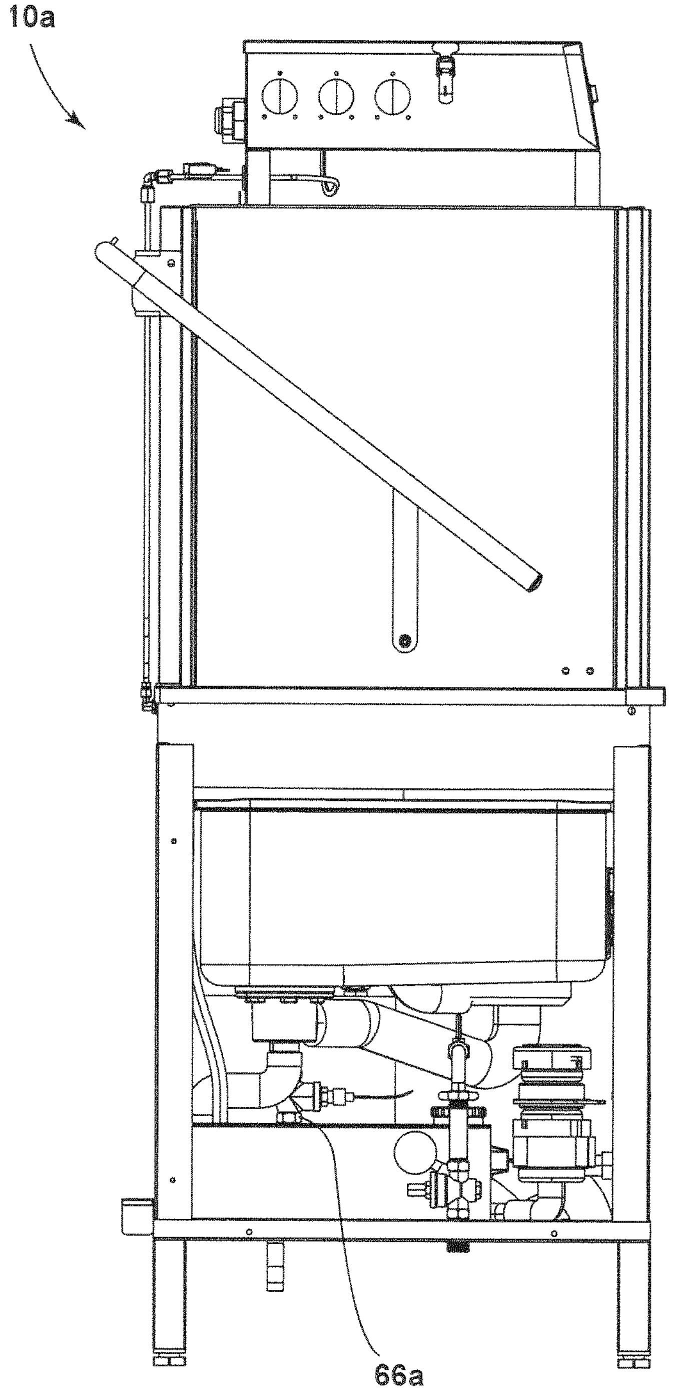
FIG. 11 is a left side view of a dish washing machine according to the second embodiment of the present invention.
Figure 12:
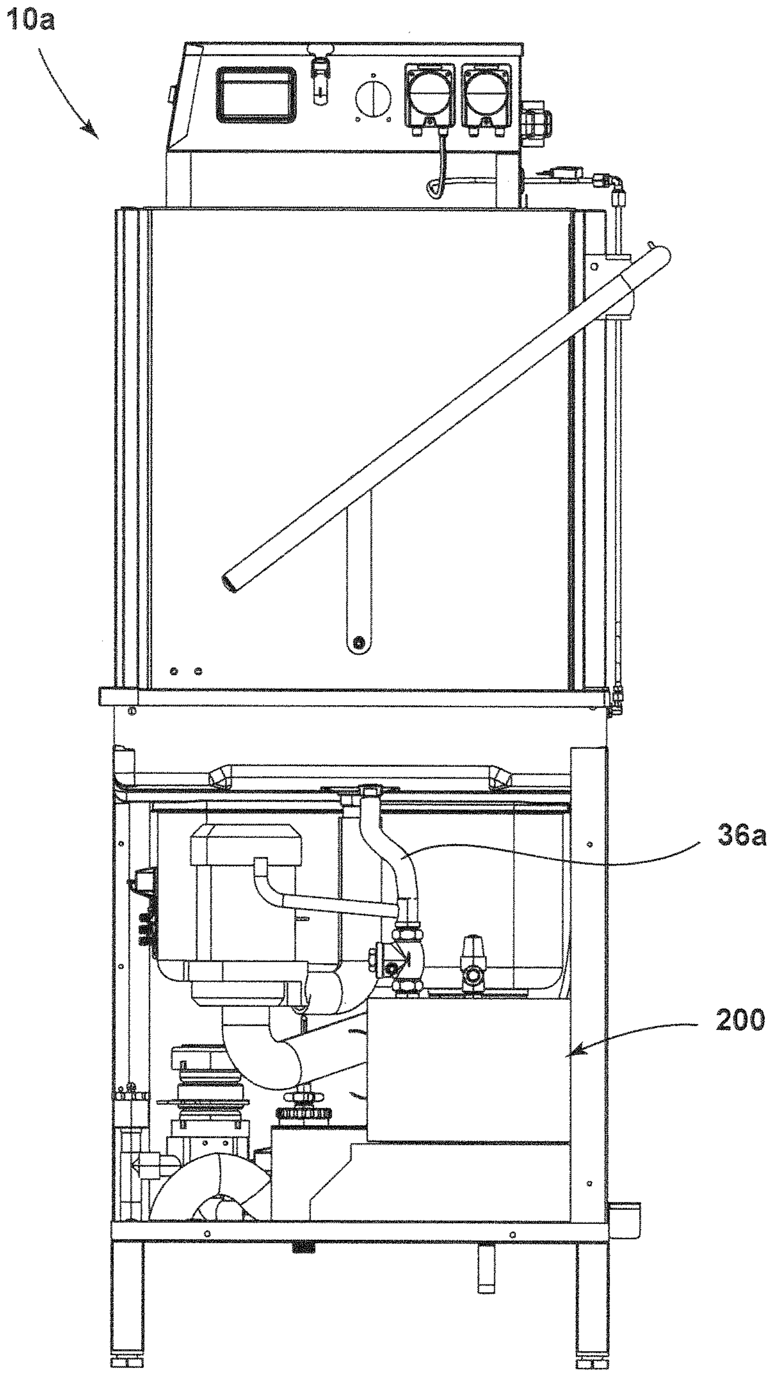
FIG. 12 is a right side view of a dish washing machine according to the second embodiment of the present invention.

The illustrated rinse water induction heated tank system 34 heats the rinse water therein through induction heating. As shown in FIG. 7, the rinse water induction heated tank system 34 includes a rinse water holding tank 100, a heat insulating cylinder 102 surrounding the rinse water holding tank 100, induction coils 104 coiled around the heat insulating cylinder 102, and a plurality of shielded magnetic strips 106 connected to and supporting the induction coils 104. The rinse water holding tank 100 can have any cross-sectional shape (e.g., circular and square) and receives the heated fresh water through a filter inlet tube 108 extending through a top surface 110 of the rinse water holding tank 100. The heat insulating cylinder 102 closely surrounds an outer surface 112 of the rinse water holding tank 100 to minimize heat escaping from the heated rinse water in the rinse water holding tank 100. The coils 104 surround the heat insulating cylinder 102. A pulsed direct current or a high-frequency alternating current is passed through the coils 104, thereby creating a magnetic flux and generating electric currents in the conducting material of the rinse water holding tank 100. In induction heating, magnetic flux from the coils 104 heats up the conducting material of the rinse water holding tank 100, with metal conducting material with magnetic properties better than metal with low or without magnetic properties. In a preferred embodiment, the rinse water holding tank 100 is formed of Stainless Steel 430 or Stainless Steel SUS 201. Furthermore, in a preferred embodiment, rinse aid is added to the water after the rinse water leaves the rinse water induction heated tank system 34 to avoid corrosion in the rinse water holding tank because of the rinse aid chemicals. Brackets 114 connected to a bottom of the rinse water holding tank 100 are used to support the rinse water induction heated tank system 34 on the bottom plate 11.

After the heated fresh water is further heated in the rinse water induction heated tank system 34, the rinse water pump 32 is further activated to push the further heated fresh water through the rinse water piping 36. The rinse water piping 36 includes a first rinse water piping path 70 that leads to the top rotating spray arm 16 and a second rinse water piping path 72 that leads to the bottom rotating spray arm 18. If other means are used to spray the water onto the dishes as discussed above, the further heated fresh water in the rinse water piping 36 will be piped to those other means.

After the further heated fresh water is sprayed through the top rotating spray arm 16 and the bottom rotating spray arm 18 onto the dishes in the interior wash space 12, the further heated fresh water will fall into the wash water tank 38 (which has an open top 76 as shown in FIG. 2) located at the bottom of the interior wash space 12. The further heated fresh water will collect within the wash water tank 38 and will be yet further heated by a positive temperature coefficient (PTC) heating element 74 for yet further heating the heated water within the wash water tank 38. The PTC heating element 74 is fully disclosed in U.S. patent application Ser. No. 18/457,569 entitled SAFE AND EFFICIENT DISH WASHING MACHINE, the entire contents of which are hereby incorporated herein by reference. A wash detergent can be added to the yet further heated water that is pooled in the wash water tank 38. An example of a system for adding a wash detergent to the heated water in the wash water tank 38 is disclosed in U.S. Pat. No. 10,905,306 entitled DISH WASHING MACHINE, the entire contents of which are hereby incorporated herein by reference. It is contemplated that other means of adding wash detergent to the heated water in the wash water tank 38 could be employed.

Once the wash water is heated in the wash water tank 38 as outlined above, the wash cycle can begin. To begin the wash cycle, a drain in the bottom of the wash water tank 38 is opened in a first manner to allow the wash water in the wash water tank 38 to be pumped by the wash water pump 40 through the wash water piping 42. The wash water piping 42 includes a wash pump supply pipe path 82 that supplies the wash water to the wash water pump 40, a wash water piping path 78 that leads from the wash water pump 40 to the top rotating spray arm 16 and to the bottom rotating spray arm 18. If other means are used to spray the water onto the dishes as discussed above, the further heated wash water in the wash water piping 42 will be piped to those other means.

After the heated wash water is sprayed through the top rotating spray arm 16 and the bottom rotating spray arm 18 onto the dishes in the interior wash space 12, the heated wash water will once again fall into the wash water tank 38 located at the bottom of the interior wash space 12. The heated wash water will collect within the wash water tank 38 and will continue to be heated by the second PTC heating element 74 before once again being pumped by the wash water pump 40 through the wash water piping 42 to be sprayed once again onto the dishes in the interior wash space 12. This wash cycle will happen many times in order to fully clean the dishes.

After the wash cycle is complete, the drain in the bottom of the wash water tank 38 is opened in a second manner to allow the wash water in the wash water tank 38 to drain into the hot waste water drain pipe 46. It is contemplated that the drain could include the wash water drain pipe located within the drain. The wash water drain pipe includes an open top area at about the same level as the open top 76 of the wash water tank 38 to allow the heated wash water that pools above the open top of the wash water drain pipe to drain into the hot waste water drain pipe 46 during the wash cycle.

In the illustrated example, most of the waste water in the hot waste water drain pipe 46 after the wash cycle will pass through the hot waste water drain pipe 46 in the fresh water reservoir 28 and the waste water drain 48 located at the end of the hot waste water drain pipe 46. However, as shown in FIG. 6, the hot waste water drain pipe 46 includes a horizontal portion 86 that holds hot waste water within the fresh water reservoir 28. The hot waste water drain pipe 46 can include an elbow hot water waste retainer 88 just outside of the fresh water reservoir 28 that includes a lower surface 90 that is above the horizontal portion 86. Because the lower surface 90 is above the horizontal portion 86, hot waste water will pool in the horizontal portion 86 in a hot waste water pool 92 as shown in FIG. 6. The hot waste water pool 92 is replaced by further hot waste water that enters the hot waste water drain pipe 46 from the drain, but the hot waste water pool 92 maintains the same amount of waste water therein because of the elbow hot water waste retainer 88. The waste water that is pushed out of the horizontal portion 86 and through the elbow hot water waste retainer 88 exits the dish washing machine through the waste water drain 48. The hot waste water in the hot waste water pool 92 exchanges heat with the fresh water within the interior fresh water holding space 58 before the fresh water is pumped to the rinse water induction heated tank system 34 as outlined above.

After the wash cycle is complete, the rinse cycle begins. The rinse cycle is identical to the wash cycle, except that a wash detergent is not added to the heated water. Therefore, the heated fresh water to be sent to the rinse water holding tank 100 is heated by the exchange of heat in the fresh water reservoir 28 and the rinse water induction heated tank system 34 as outlined above. The heated fresh water in the rinse water induction heated tank system 34 is then pumped through the rinse water piping 36 by the rinse water pump 32 to the top rotating spray arm 16 and the bottom rotating spray arm 18 (or other spraying means). After passing through the interior wash space 12, the heated water will pool in the wash water tank 38 to be further heated by the PTC heating element 74 as outlined above. A rinse aid can be added to the heated water after the heated water leaves the rinse water induction heated tank system 34 or in the wash water tank 38. An example of a system for adding a rinse to the heated water is disclosed in U.S. Pat. No. 10,905,306 entitled DISH WASHING MACHINE, the entire contents of which are hereby incorporated herein by reference. It is contemplated that other means of adding rinse aid to the heated water after leaving the rinse water induction heated tank system 34 or the wash water tank 38 could be employed.

During the rinse cycle, the heated water is continuously pumped from the wash water tank 38 through the wash water piping 42 as outlined above to be sprayed through the top rotating spray arm 16 and the bottom rotating spray arm 18 (or other spraying means). After the rinse cycle is complete, the waste water drains from the wash water tank 38 in a manner identical to the waste water exiting the wash water tank 38 through the drain and into the hot waste water drain pipe 46 as outlined above to exit the dish washing machine 10 and form the hot waste water pool 92 to exchange heat within the fresh water reservoir 28 as outlined above.

In the wash cycle and the rinse cycle as outlined above, the fresh water entering the dish washing machine 10 is heated in three different areas: through the exchange of heat with waste water in the fresh water reservoir 28, by the rinse water induction heated tank system 34, and by the PTC heating element 74 in the wash water tank 38. However, it is contemplated that any one or only two of these three methods of heating the water could be employed.

The reference numeral 10*a* (FIGS. 8-12) generally designates a second embodiment of the present invention, having a second embodiment for the dish washing machine. Since dish washing machine 10*a* is similar to the previously described dish washing machine 10, similar parts appearing in FIGS. 1-6 and FIGS. 8-12 respectively, are represented by the same, corresponding reference number, except for the suffix "a" in the numerals of the latter. The second embodiment dish washing machine 10*a* is identical to the previously described dish washing machine 10, except that the second embodiment dish washing machine 10*a* has a second embodiment of a rinse water induction heated tank system 200. The second embodiment of the rinse water induction heated tank system 200 receives rinse water from the pump piping 66*a* and the induction heated water leaves the second embodiment of the rinse water induction heated tank system 200 through the rinse water piping 36*a*.

Figure 13:
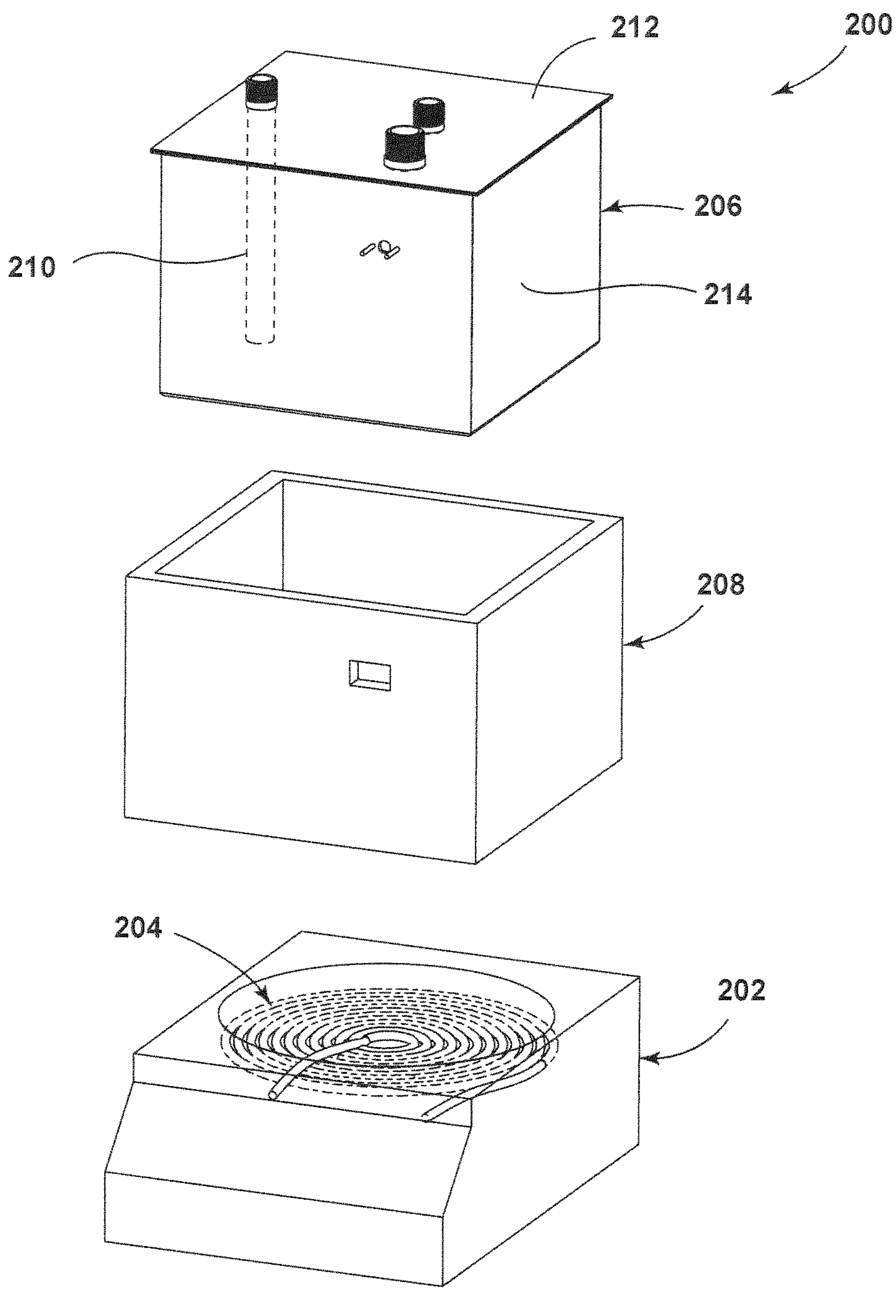
FIG. 13 is an exploded view of a second embodiment of an induction water heating system.

The illustrated second embodiment of the rinse water induction heated tank system 200 as illustrated in FIG. 13 includes a base 202 having induction coils 204 in the shape of a pancake therein. A rinse water tank 206 connected to the pump piping 66*a* and the rinse water piping 36*a* is located on a top of the base 202. A rectangular heat insulating sleeve 208 surrounds the rinse water tank 206. The rinse water tank 206 can have any cross-sectional shape (e.g., circular and square) and receives the heated fresh water through a filter inlet tube 210 extending through a top surface 212 of the rinse water tank 206. The heat insulating sleeve 208 closely surrounds an outer surface 214 of the rinse water tank 206 to minimize heat escaping from the heated rinse water in the rinse water tank 206. A pulsed direct current or a high-frequency alternating current is passed through the coils 204, thereby creating a magnetic flux and generating electric currents in the conducting material of the rinse water tank 206 to directly heat the water therein. In induction heating, magnetic flux from the coils 204 heats up the conducting material of the rinse water tank 206, with metal conducting material with magnetic properties better than metal with low or without magnetic properties. In a preferred embodiment, the rinse water tank 206 is formed of Stainless Steel 430 or Stainless Steel SUS 201. Furthermore, in a preferred embodiment, rinse aid is added to the water after the rinse water leaves the rinse water induction heated tank system 200 to avoid corrosion in the rinse water tank 206 because of the rinse aid chemicals.

In an embodiment, at least one of the first heating system and the second heating system can comprise a stainless steel shell with a positive temperature coefficient heating array located therein, with the positive temperature coefficient heating array comprising a plurality of positive temperature coefficient heating elements, with a temperature sensor being connected to a heater cover, and with the temperature sensor measuring a temperature of the first heating system to maintain the temperature of the first heating system under a predetermined temperature.

Although particular preferred embodiments of the invention have been disclosed in detail for illustrative purposes, it will be recognized that variations or modifications of the disclosed apparatus, including the rearrangement of parts, lie within the scope of the present invention. For example, it is contemplated that only a single rotating spray arm (upper or lower) could be used.

What is claimed is:

1. A method of washing dishes comprising:

providing a housing having an interior wash space for receiving dishes;

adding initial water, which is fresh water, to a dish washing machine;

feeding the initial water to a fresh water reservoir;

heating the initial water in the fresh water reservoir to form initially heated initial water;

delivering the initially heated initial water to a first water tank;

heating the initially heated initial water in the first water tank with a first heating system to form secondarily heated initial water;

supplying the secondarily heated initial water to at least one spray nozzle;

spraying the secondarily heated initial water onto the dishes received within the interior wash space;

delivering the secondarily heated initial water from the interior wash space to a second water tank;

heating the secondarily heated initial water in the second water tank with a second heating system to form heated wash water;

delivering the heated wash water to the at least one spray nozzle;

spraying the heated wash water into the interior wash space; and draining the heated wash water through a drain pipe that passes through the fresh water reservoir and to a liquid outlet;

wherein at least one of the first heating system and the second heating system heats water through induction.

2. The method of claim 1, further including:

pumping the secondarily heated initial water from the first water tank to the at least one spray nozzle with a pump.

3. The method of claim 1, wherein:

the at least one spray nozzle is a plurality of spray nozzles located on a top rotating arm and a bottom rotating arm.

4. The method of claim 1, wherein:

the drain pipe includes a horizontal portion within the fresh water reservoir and an elbow hot water waste retainer just outside of the fresh water reservoir, the elbow hot water waste retainer including a lower surface that is above the horizontal portion to allow the heated wash water to pool in the horizontal portion.

5. The method of claim 1, further including:

pumping the secondarily heated initial water from the first water tank to the at least one spray nozzle with a first pump; and pumping the heated wash water from the second water tank to the at least one spray nozzle with a second pump.

6. The method of claim 1, wherein:

a heat insulating cylinder surrounding the first water tank and induction coils coiled around the heat insulating cylinder, the coils receiving a current therethrough to heat the initially heated initial water in the first water tank.

7. The method of claim 1, wherein: the first heating system comprises a base having induction coils therein in a pancake shape and a rectangular heat insulating sleeve surrounding the first water tank, with the first water tank being positioned on top of the base, and with the coils receiving a current therethrough to heat the initially heated initial water in the first water tank.

8. A method of washing dishes comprising:

providing a housing having an interior wash space for receiving dishes;

adding initial water to a dish washing machine;

delivering the initial water to a first water tank;

heating the initial water in the first water tank with a first heating system to form heated initial water;

supplying the heated initial water to at least one spray nozzle;

spraying the heated initial water onto the dishes positioned within the interior wash space;

delivering the heated initial water from the interior wash space to a second water tank;

heating the heated initial water in the second water tank with a second heating system to form heated wash water;

delivering the heated wash water to the at least one spray nozzle; and spraying the heated wash water into the interior wash space;

wherein at least one of the first heating system and the second heating system heats water through induction; and wherein at least one of the first heating system and the second heating system comprise a stainless steel shell with a positive temperature coefficient heating array located therein, the positive temperature coefficient heating array comprising a plurality of positive temperature coefficient heating elements, with a temperature sensor being connected to a heater cover; and the method further comprises measuring, a temperature of the first heating system with the temperature sensor to maintain the temperature of the first heating system under a predetermined temperature.

* * * * *